United States Patent
Tashiro et al.

(10) Patent No.: US 12,134,437 B2
(45) Date of Patent: Nov. 5, 2024

(54) ASSEMBLY METHOD AND ASSEMBLY DEVICE FOR SUSPENSION DEVICE OF VEHICLE AND MIXED MODEL PRODUCTION LINE

(71) Applicant: MAZDA MOTOR CORPORATION, Hiroshima (JP)

(72) Inventors: Manabu Tashiro, Hiroshima (JP); Noriaki Toyama, Hiroshima (JP); Tomomi Kajiya, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 112 days.

(21) Appl. No.: 17/759,311

(22) PCT Filed: Jan. 19, 2021

(86) PCT No.: PCT/JP2021/001724
§ 371 (c)(1),
(2) Date: Jul. 22, 2022

(87) PCT Pub. No.: WO2021/157344
PCT Pub. Date: Aug. 12, 2021

(65) Prior Publication Data
US 2023/0054319 A1 Feb. 23, 2023

(30) Foreign Application Priority Data
Feb. 7, 2020 (JP) .................................. 2020-019897

(51) Int. Cl.
*B62D 65/12* (2006.01)
*B23P 21/00* (2006.01)
(Continued)

(52) U.S. Cl.
CPC .............. *B62D 65/12* (2013.01); *B23P 21/00* (2013.01); *B25B 27/304* (2013.01); *B60G 9/00* (2013.01);
(Continued)

(58) Field of Classification Search
CPC .......................... B60G 2206/91; B26D 65/026
See application file for complete search history.

(56) References Cited

U.S. PATENT DOCUMENTS 9,944,336 B2 * 4/2018 Ogawa ................... B62D 65/18

FOREIGN PATENT DOCUMENTS

CN 107148325 A 9/2017
JP H06-155178 A 6/1994
(Continued)

OTHER PUBLICATIONS

English Machine Translation of WO-2016075378-A1 (Year: 2016).*
International Search Report issued in PCT/JP2021/001724; mailed Apr. 6, 2021.

*Primary Examiner* — Sarang Afzali
(74) *Attorney, Agent, or Firm* — Studebaker & Brackett PC

(57) ABSTRACT

A coil spring is interposed between a vehicle body and a suspension member which is elastically and swingably supported by the vehicle body and supports a wheel. The suspension member and a vehicle part attached to the vehicle body are connected by a fastening member. The orientation of the suspension member with respect to the vehicle body is forcibly changed so as to increase the distance between the vehicle body and the suspension member at a coil spring interposition portion. An excessive change in the orientation of the suspension member is
(Continued)

restricted by the fastening member, and a coil spring is inserted between the vehicle body and the suspension member.

4 Claims, 9 Drawing Sheets

(51) Int. Cl.
*B25B 27/30* (2006.01)
*B60G 9/00* (2006.01)
(52) U.S. Cl.
CPC .... *B60G 2206/91* (2013.01); *B60G 2206/921* (2013.01)

(56) References Cited

FOREIGN PATENT DOCUMENTS

| JP | 2001-010563 A | 1/2001 | | |
|---|---|---|---|---|
| JP | 2001-062749 A | 3/2001 | | |
| JP | 2016-074318 A | 5/2016 | | |
| WO | WO-2016075378 A1 | * | 5/2016 | ........... B25B 27/304 |

* cited by examiner

ASSEMBLY METHOD AND ASSEMBLY DEVICE FOR SUSPENSION DEVICE OF VEHICLE AND MIXED MODEL PRODUCTION LINE

TECHNICAL FIELD

The present disclosure relates to an assembly method and an assembly device for a suspension device of a vehicle, and a mixed model production line.

BACKGROUND ART

A method for attaching a suspension device to a vehicle body in a process of conveying the vehicle body in a suspended condition is described in Japanese Patent Laid-Open No. 2001-10563. This method includes: bringing a lift member into contact with a suspension part which is temporarily fastened to the vehicle body and located at a full rebound position; detecting the full rebound position by the contact; lifting the suspension part by only a predetermined amount from this detection position as a starting point; and completing, in this state, tightening of an elastic part (rubber bushing) in the suspension device. By always keeping the amount of lifting the suspension part uniform, even when the full rebound position varies depending on each vehicle body, the suspension part is returned to an appropriate position with respect to the vehicle body, and the elastic part is tightened.

SUMMARY

The problem to be solved by the present disclosure relates to interposing a coil spring between a vehicle body and a suspension member.

As a method for interposing the coil spring, it has been known to lift the suspension member in a state in which the coil spring is mounted to the suspension member, and attach the suspension member to the vehicle body. However, in this method, since the vehicle body floats due to a repulsive force of the coil spring, it is necessary to prevent floating by attaching a jig to the vehicle body. At this time, a great force against the repulsive force of the spring is applied to the vehicle body through the jig. Therefore, the strength of the vehicle body needs to be increased to prevent distortion of the vehicle body. In order to increase the strength of the vehicle body, it is necessary to increase the plate thickness of the vehicle body, and mount a reinforcement member on the vehicle body, which are disadvantageous for a light weight of the vehicle body. Moreover, in the case of mixed model production, although it does not mean to limit the present disclosure, since the shape and height of a jig mount portion varies depending on vehicle models, it is necessary to prepare an exclusive floating prevention device for each vehicle model, which hinders smooth mixed model production, and increases the cost of the device.

Hence, the present inventors studied a method in which, after elastically and swingably supporting the suspension member by the vehicle body, the coil spring is interposed between the suspension member and the vehicle body. This is a method in which the orientation of the suspension member with respect to the vehicle body is forcibly changed so as to increase the distance between the vehicle body and the suspension member at an interposition portion of the coil spring, and the coil spring is inserted into the portion. However, even if the orientation of the suspension member is forcibly changed, the orientation cannot be changed infinitely. It is necessary to prevent a member constituting a suspension from interfering with other vehicle components, for example, a fuel tank, or it is necessary to prevent structural strain from being applied to other vehicle components.

Regarding the case in which structural strain is applied to other vehicle components, for example, there is a possible case in which a drive shaft connecting a differential gear (diff gear) secured to the vehicle body side of a four-wheel drive vehicle and a carrier of a suspension member comes out of the diff gear when the orientation of the suspension member is changed excessively. This is a so-called dislocation. Furthermore, from the viewpoints of preventing damage to a support portion supporting the suspension member swingably on the vehicle body, and preventing deformation of the suspension member and the vehicle body, there is a limit to changing the orientation of the suspension member.

In contrast, it is possible to add a stopper to an orientation changing device for changing the orientation of the suspension member, and prevent a further change when the suspension member is changed to a predetermined position. However, on an actual production line, there is a deviation in the height of the vehicle body due to wear of a vehicle body conveyance device, and the vehicle body may become a front raised state or a rear raised state depending on vehicle models, and thus the position of the suspension member of the vehicle body is not necessarily uniform. Therefore, even if the change in the orientation of the suspension member caused by the orientation changing device is restricted by the stopper or the like, the amount of change in the orientation of the suspension member with respect to the vehicle body is not uniform. In other words, there is a possibility that the orientation of the suspension member may be changed excessively, the suspension device interferes with other vehicle body components, and strain is applied to the suspension device and other vehicle body components.

The present disclosure makes it possible to interpose the coil spring between the vehicle body and the suspension member while preventing the suspension device from interfering with other vehicle body components, and avoiding strain to the suspension device and other vehicle body components as described above.

In order to solve the above problem, when inserting the coil spring between the suspension member and the vehicle body by changing the orientation of the suspension member, the present disclosure restricts the change in the orientation relative to the vehicle body.

An assembly method for a suspension device of a vehicle is provided, the suspension device including a suspension member which is elastically and swingably supported by a vehicle body and supports a wheel; and a coil spring which is interposed between the vehicle body and the suspension member and receives a compression load. The assembly method disclosed here is characterized by:

bringing a fastening member into a distorted state, and connecting the suspension member, which is elastically and swingably supported by the vehicle body, and the vehicle body or a vehicle part attached to the vehicle body, by the fastening member, the fastening member being stretchable to a stretched state wherein it extends to a certain length when tension is applied;

forcibly changing orientation of the suspension member with respect to the vehicle body so as to increase a distance between the vehicle body and the suspension member at an interposition portion of the coil spring;

restricting an excessive change in the orientation of the suspension member (in other words, an excessive increase in the distance) relative to the vehicle body by the fastening member which stretches to the stretched state wherein it extends to the certain length with the increase in the distance caused by the change in the orientation of the suspension member, and inserting the coil spring between the vehicle body and the suspension member.

An assembly device for a suspension device of a vehicle is provided, the suspension device including a suspension member which is elastically and swingably supported by a vehicle body and supports a wheel; and a coil spring which is interposed between the vehicle body and the suspension member and receives a compression load, the assembly device including:

an orientation changing mechanism for forcibly changing orientation of the suspension member with respect to the vehicle body so as to increase a distance between the vehicle body and the suspension member at an interposition portion of the coil spring, for interposing the coil spring; and a fastening member which connects the vehicle body or a vehicle part attached to the vehicle body and the suspension member, stretches to a stretched state wherein it extends to a certain length with the increase in the distance caused by the change in the orientation of the suspension member, and restricts an excessive change in the orientation of the suspension member (in other words, an excessive increase in the distance) relative to the vehicle body.

In this assembly method or assembly device, in order to insert the coil spring between the vehicle body and the suspension member, the distance at the interposition portion of the coil spring is increased by forcibly changing the orientation of the suspension member. At this time, the fastening member connecting the suspension member and the vehicle body or the vehicle part is stretched from the distorted state with the change in the orientation of the suspension member. When the change in the orientation of the suspension member with respect to the vehicle body reaches a predetermined amount, the fastening member reaches the stretched state, and the orientation of the suspension member cannot be changed further. That is to say, the relative orientation change amount of the suspension member in relation to the vehicle body can be restricted by the fastening member.

Thus, since the orientation change amount of the suspension member is restricted relative to the vehicle body, even if the position and orientation of the vehicle body are not uniform due to wear of a vehicle body conveyance device or the like, when the orientation of the suspension member is changed, it is possible to prevent interference of the suspension device with other vehicle body components, or avoid strain on the suspension device and other vehicle body components. That is to say, without causing such troubles, it is possible to change the orientation of the suspension member and insert the coil spring between the vehicle body and the suspension member.

In one embodiment of the above method, in a state in which the orientation of the suspension member is changed until the fastening member reaches the stretched state, the coil spring is inserted between the vehicle body and the suspension member. Consequently, since the distance between the vehicle body and the suspension member at the interposition portion of the coil spring is maximally increased, it is easy to insert the coil spring into the portion.

In one embodiment of the assembly method and the assembly device, when the orientation of the suspension member is changed until the fastening member is in the stretched state, the distance between the vehicle body and the suspension member at the interposition portion of the coil spring is increased to a size allowing insertion of the coil spring into the portion without compressing the coil spring. Therefore, since there is no need to compress the coil spring before the insertion, a reduction in the cycle time of the assembly process is achieved, which is advantageous for improving the productivity, and damage to the coil spring due to a compression jig or the like is prevented.

In one embodiment of the assembly method and the assembly device, the suspension member is elastically and swingably supported by the vehicle body through a rubber bushing, and the vehicle body or the vehicle part and the suspension member are connected by the fastening member, on an opposite side of the interposition portion of the coil spring from the rubber bushing on the suspension member.

Accordingly, this is advantageous for restricting an excessive change in the orientation of the suspension member by the fastening member, and the fastening member does not interfere with insertion of the coil spring between the vehicle body and the suspension member, thereby facilitating the insertion.

In one embodiment of the assembly method and the assembly device, the suspension member is a torsion beam suspension member, and a spring seat for disposing the coil spring is provided on a swing arm of the suspension member.

In one embodiment of the assembly method and the assembly device, a damper for connecting the vehicle body and the swing arm is provided as the vehicle part, the orientation of the swing arm is forcibly changed in a state in which the damper is coupled to the vehicle body and is not coupled to the swing arm, and the fastening member is connected to a coupling portion of the damper with respect to the swing arm.

Accordingly, the fastening member can be disposed using the coupling portion of the damper with respect to the swing arm. That is to say, there is no need to newly provide a part on the vehicle body side to connect the fastening member, and this is advantageous for reducing the cost of product.

The assembly method can be implemented on a mixed model production line for assembling a plurality of vehicle models, and the assembly device can be used on the mixed model production line.

According to the present disclosure, when the distance between the vehicle body and the suspension member at the interposition portion of the coil spring is increased by forcibly changing the orientation of the suspension member, the fastening member connecting the suspension member and the vehicle body or the vehicle part stretches to the stretched state, thereby restricting an excessive change in the orientation. That is to say, the orientation change amount of the suspension member is restricted in relation relative to the vehicle body. Therefore, even when the position and orientation of the vehicle body are not always uniform due to wear of a vehicle body conveyance device or the like, it is possible to change the orientation of the suspension member, and insert the coil spring between the vehicle body and the suspension member, without causing troubles such as interference of the suspension device with other vehicle body components, and strain on the suspension device and other vehicle body components.

DETAILED DESCRIPTION

Hereinafter, embodiments for implementing the present disclosure will be described based on the drawings. The following description of a preferred embodiment merely shows an example in nature, and is not intended to limit the present disclosure, objects to which the present disclosure is applied, or the applications.

Suspension Device

Figure 1:
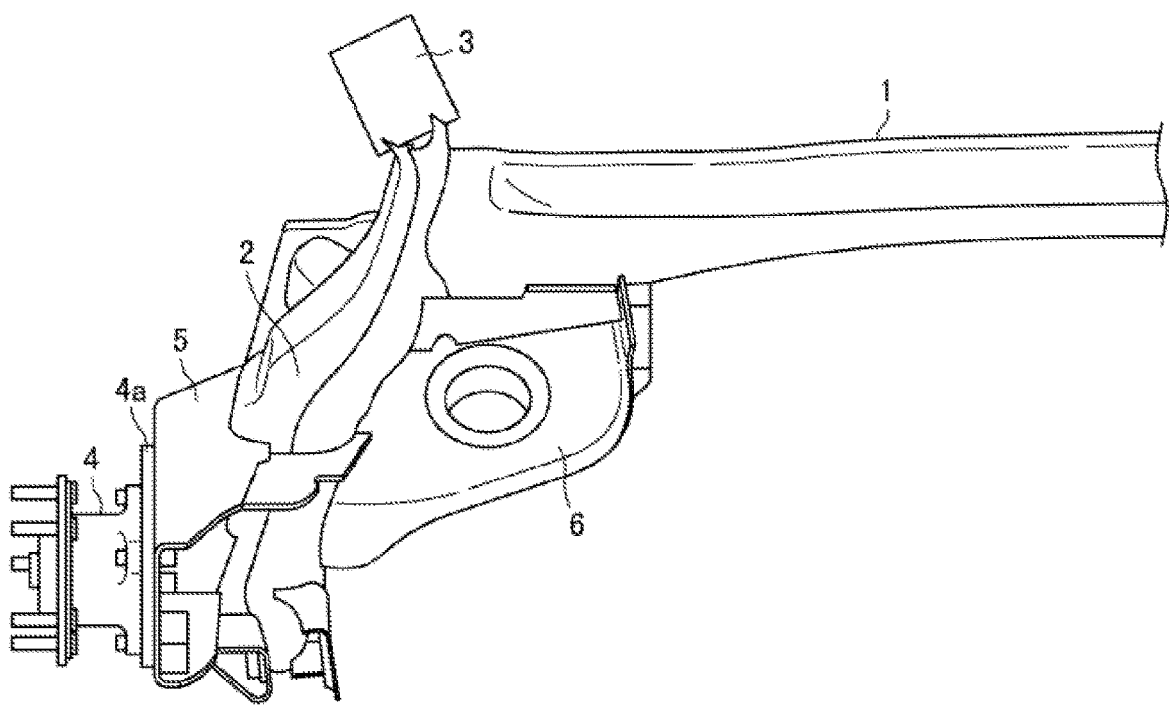
FIG. 1 is a bottom view of a torsion beam suspension member.

FIG. 1 shows part of a torsion beam suspension member constituting a suspension device of a vehicle. FIG. 1 is a bottom view of the suspension member seen from the lower side. The suspension member includes a torsion beam 1 extending in a vehicle width direction, and swing arms 2 disposed on both sides of the torsion beam 1. In FIG. 1, although only the swing arm 2 on one side is illustrated, the swing arm on the opposite side is also formed similarly to the swing arm 2 on the one side. The swing arm 2 extends in a vehicle front-rear direction. Near-front-end portions of the left and right swing arms 2 are connected by the torsion beam 1.

At a front end of each swing arm 2, a rubber bushing 3 for connecting the swing arm 2 to the vehicle body is mounted. The rubber bushing 3 is a made of a rubber elastic body interposed between an outer cylinder secured to the front end of the swing arm 2 and an inner cylinder installed inside the outer cylinder. The swing arm 2 is elastically supported by the rubber bushing 3 so as to be swingable up and down with respect to the vehicle body. An axle device 4 for supporting a wheel is secured near a rear end portion of the swing arm 2 through a flange member 4a and a bracket 5.

A spring seat 6 is secured at a corner portion formed by the torsion beam 1 and the swing arm 2. A coil spring, which receives a compressive load, is interposed between the spring seat 6 and the vehicle body.

Assembly Device for Suspension Device

Figure 2:
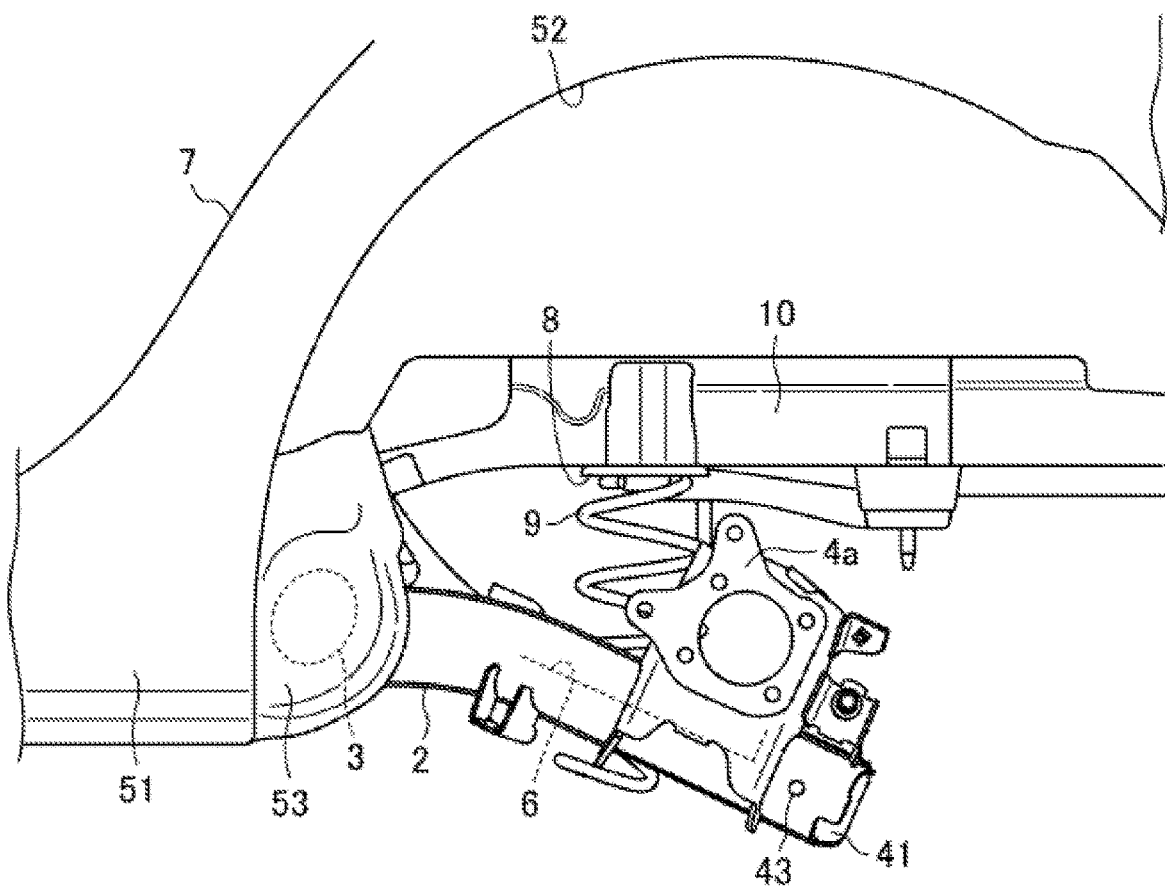
FIG. 2 is a side view of a vehicle body to which the suspension member is attached.

As shown in FIG. 2, the suspension device is assembled by inserting a coil spring 9 between a spring seat 8 on the vehicle body side and the spring seat 6 on the swing arm 2 side after supporting the swing arm 2 on the vehicle body 7 by the rubber bushing 3. That is to say, the suspension member is attached to the vehicle body. The spring seat 8 on the vehicle body side is secured to a rear side frame 10 extending in a vehicle front-rear direction.

In the state in which the swing arm 2 is supported by the vehicle body 7 through the rubber bushing 3, since the rubber bushing 3 has elastic restoring force, as shown in FIG. 2, the distance between the spring seats 6 and 8 is not enough to interpose the coil spring 9 in a free state. Therefore, this assembly device is used to forcibly change the orientation of the swing arm 2, i.e., forcibly pivot the swing arm 2 downward so as to increase the distance between the spring seats 6 and 8 for facilitating the interposing of the coil spring 9.

Figure 3:
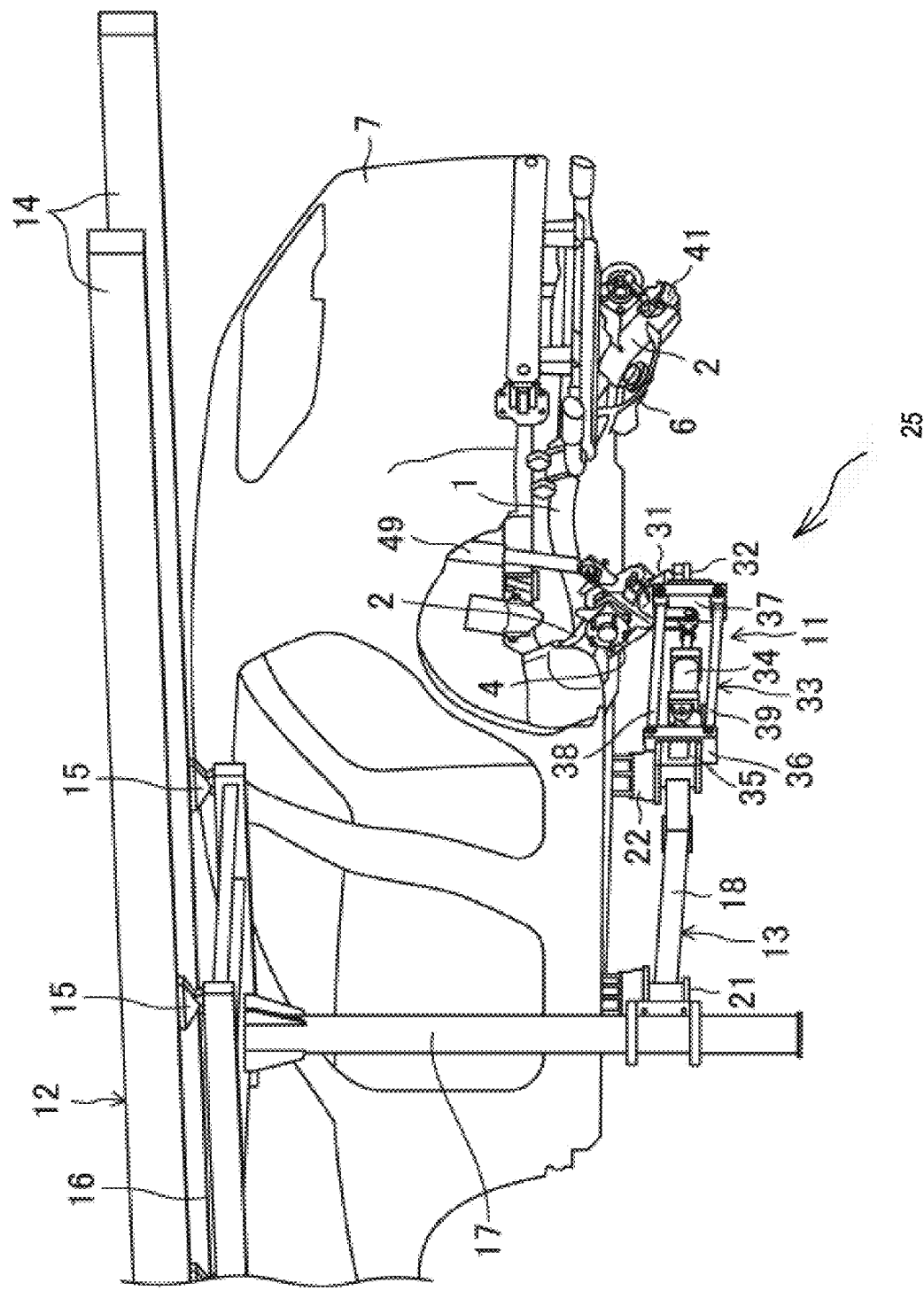
FIG. 3 is a perspective view showing a suspension assembly device for a vehicle.

As shown in FIG. 3, the assembly device for the suspension device includes an assembly equipment 11, and an assembly equipment traveling device 12 and an assembly equipment position alignment device 13 arranged beside a conveyance line for the vehicle body 7 (vehicle body conveyance line of a mixed model production line for assembling a plurality of vehicle models). Although illustration is omitted, the vehicle body 7 is conveyed by an overhead conveyor (hanger type conveyance device).

The assembly equipment traveling device 12 is for traveling the assembly equipment 11 in synchronization with the vehicle body 7, and includes: two parallel guide rails 14 extending along the conveyance line for the vehicle body 7; a trolley 15 which travels while being supported by the guide rails 14; and a traveling body 16 supported by the trolley 15. The trolley 15 is controlled to travel in synchronization with the vehicle body 7. A pole 17 is secured to the traveling body 16, and extends downward.

The assembly equipment position alignment device 13 includes a swivel arm 18, a first swivel part 21, and a second swivel part 22. The swivel arm 18 is supported on the pole 17 by the first swivel part 21 so as to be able to swivel around a perpendicular axis. The assembly equipment 11 is supported at a distal end of the arm 18 by the second swivel part 22 so as to be able to swivel around a perpendicular axis. Positioning of a later-described engaging member 31 of the assembly equipment 11 relative to the swing arm 2 is performed by swiveling the swivel arm 18 by the first swivel part 21 and swiveling the assembly equipment 11 by the second swivel part 22.

Figure 4:
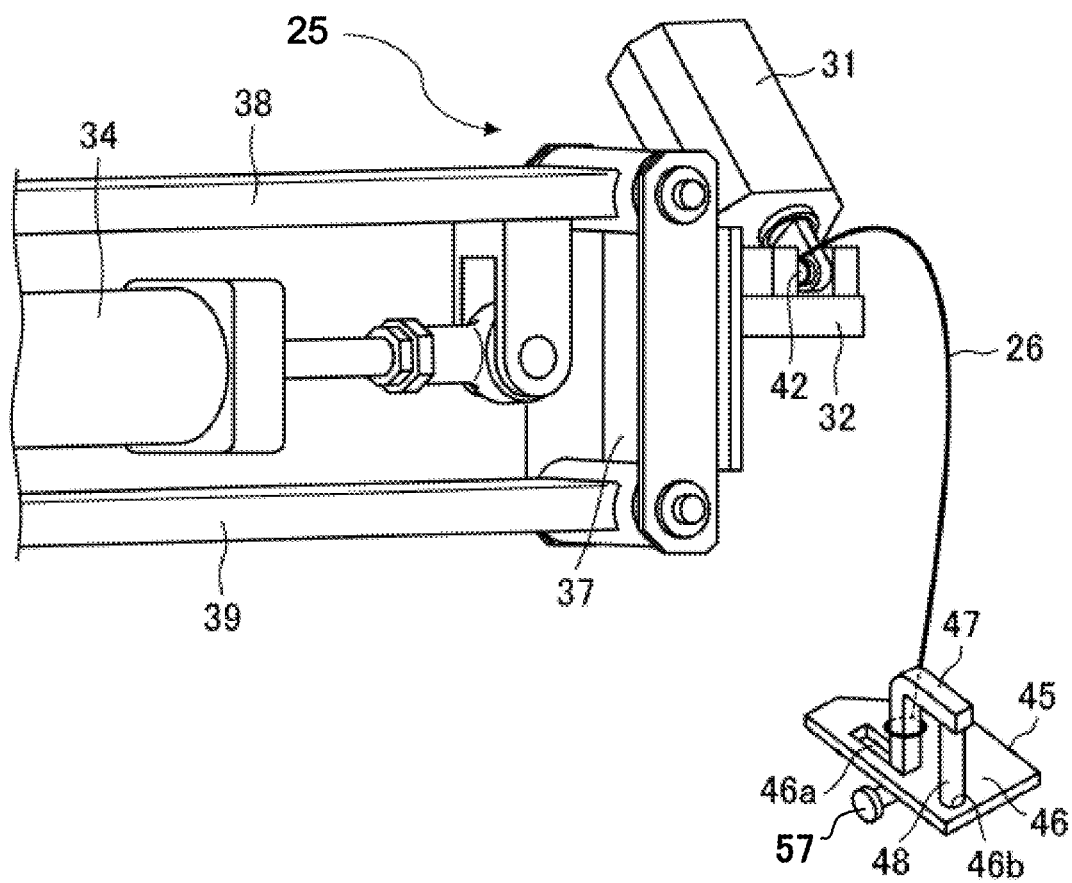
FIG. 4 is a perspective view of essential parts of the suspension assembly device.

The assembly equipment 13 includes an orientation changing mechanism 25 that forcibly changes the orientation of the swing arm 2, and a fastening member 26, shown in FIG. 4, that restricts an excessive change in the orientation of the swing arm 2 caused by the orientation changing mechanism 25.

The orientation changing mechanism 25 includes the engaging member 31 that engages with the swing arm 2, a support member 32 that supports the engaging member 31, a parallel link mechanism 33 that supports the engaging member 31 on the second swivel part 22 together with the support member 32 so as to be movable up and down, and a drive cylinder 34 that activates the parallel link mechanism 33.

The parallel link mechanism 33 includes a base plate 36 secured to a turning swivel member 35 of the second swivel part 22, a movable plate 37 secured to the support member 32 of the engaging member 31, and links 38, 39 arranged one above another in parallel. The drive cylinder 34 is mounted such that a proximal end of the cylinder portion is pivotally supported by a bracket mounted near a proximal end of the lower link 39, and the top of a piston rod is pivotally supported by a bracket mounted near a distal end of the upper link 38. In this example, when the drive cylinder 34 is activated to retract the piston rod, the movable plate 37 is lowered. That is to say, the engaging member 31 is lowered.

The engaging member 31 engages with the swing arm 2 by being fitted into a rear-end opening 41 (see FIG. 2) of the swing arm 2 having a closed cross-sectional shape, on the opposite side of the spring seat 6 from the rubber bushing 3.

As shown in FIG. 4, the proximal end of the engaging member 31 is pivotally supported on the support member 32 by a support shaft 42, which extends in the vehicle width direction, such that the engaging member 31 is able to swing up and down, and protrudes forward. On a side surface of the engaging member 31, there is an opening of a pin hole (illustration is omitted) corresponding to a hole 43 opening on a side surface of the rear end of the swing arm 2, and disengagement of the swing arm 2 and the engaging member 31 is prevented by inserting a stopper pin into both the holes.

The fastening member 26 of the present embodiment is made of a wire, and a proximal end of the fastening member 26 is tied to the support shaft 42, and a distal end thereof is tied to a fastener 45 for fastening the swing arm 2 to the vehicle body side. The fastener 45 includes a base plate 46, an L-shaped member 47 to which a connection pin 48 is secured, and an engagement pin 57 which engages the L-shaped member 47 with the base plate 46. The base plate 46 has a long hole 46a, and a pin hole 46b. The L-shaped member 47 is put through the long hole 46a of the base plate 46. The connection pin 48 is put through the pin hole 46b of the base plate 46. By engaging the engagement pin 57 with the L-shaped member 47 protruding to the back surface side of the base plate 46, the L-shaped member 47 and the connection pin 48 are held on the base plate 46. The fastening member 26 is tied to the L-shaped member 47 of the fastener 45.

As to be described in detail later, when the swing arm 2 is forced to pivotally move downward in a state in which the fastener 45 is coupled to the vehicle body side, the fastening member 26 stretches to a stretched state, thereby restricting an excessive change in the orientation of the swing arm 2 in relation relative to the vehicle body 7. That is to say, when the orientation of the swing arm 2 is changed until the fastening member 26 is in the stretched state, the distance between the spring seats 6 and 8 is increased to a size allowing insertion of the coil spring 9 between the spring seats 6 and 8 without compressing the coil spring 9.

When the orientation of the swing arm 2 is changed until the fastening member 26 is in the stretched state, a further orientation change is restricted by the fastening member 26. Therefore, the distance between the spring seats 6 and 8 is not excessively increased to be more than the above-described size.

The support shaft 42 to which the proximal end of the fastening member 26 is tied is mounted on the support member 32 of the engaging member 31 which is fitted into the rear-end opening 41 of the swing arm 2 as described above. This means that the fastening member 26 connects the swing arm 2 and the vehicle body 7, on the opposite side of the spring seat 6 from the rubber bushing 3.

Figure 5:
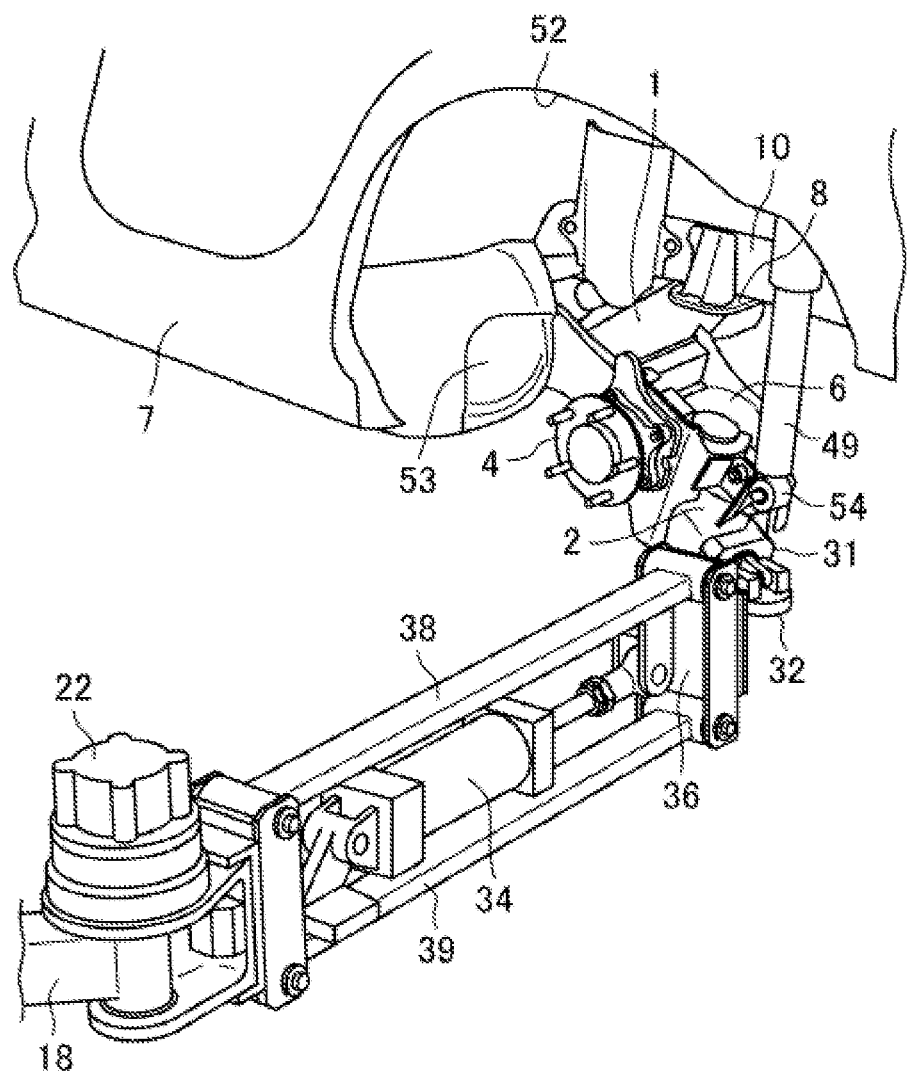
FIG. 5 is a perspective view, seen from a vehicle side, of a state in which the suspension assembly device is engaged with the suspension member attached to the vehicle body.

In the present embodiment, the fastener 45 is coupled to a lower end of a damper 49 that is a vehicle part connecting the swing arm 2 and the vehicle body 7 as shown in FIG. 5 or the like. This point will be described later.

Assembly Method for Suspension Device

The suspension device is assembled using the assembly device.

As shown in FIG. 5, a front end of the swing arm 2 is supported by a bracket 53 extending from a side sill 51 of the vehicle body 7 to the inside of a wheel house 52. Although detailed illustration is omitted, the support shaft of the swing arm 2 inserted into the inner cylinder of the rubber bushing 3 is secured to the bracket 53.

After supporting each of the left and right swing arms 2 on the vehicle body 7 by the rubber bushing 3, positioning of the assembly equipment 11, which travels in synchronization with the vehicle body 7 by the activation of the traveling device 12, with respect to the swing arm 2 is performed. That is to say, using the swivel movement of the swivel arm 18 caused by the first swivel part 21 and the swivel movement of the assembly equipment 11 caused by the second swivel part 22, a worker aligns the engaging member 31 of the assembly equipment 11 with the position of the rear-end opening 41 of the swing arm 2. This engaging member 31 is inserted into the swing arm 2 from the rear-end opening 41, and coming off of the engaging member 31 is prevented by the stopper pin.

Figure 6:
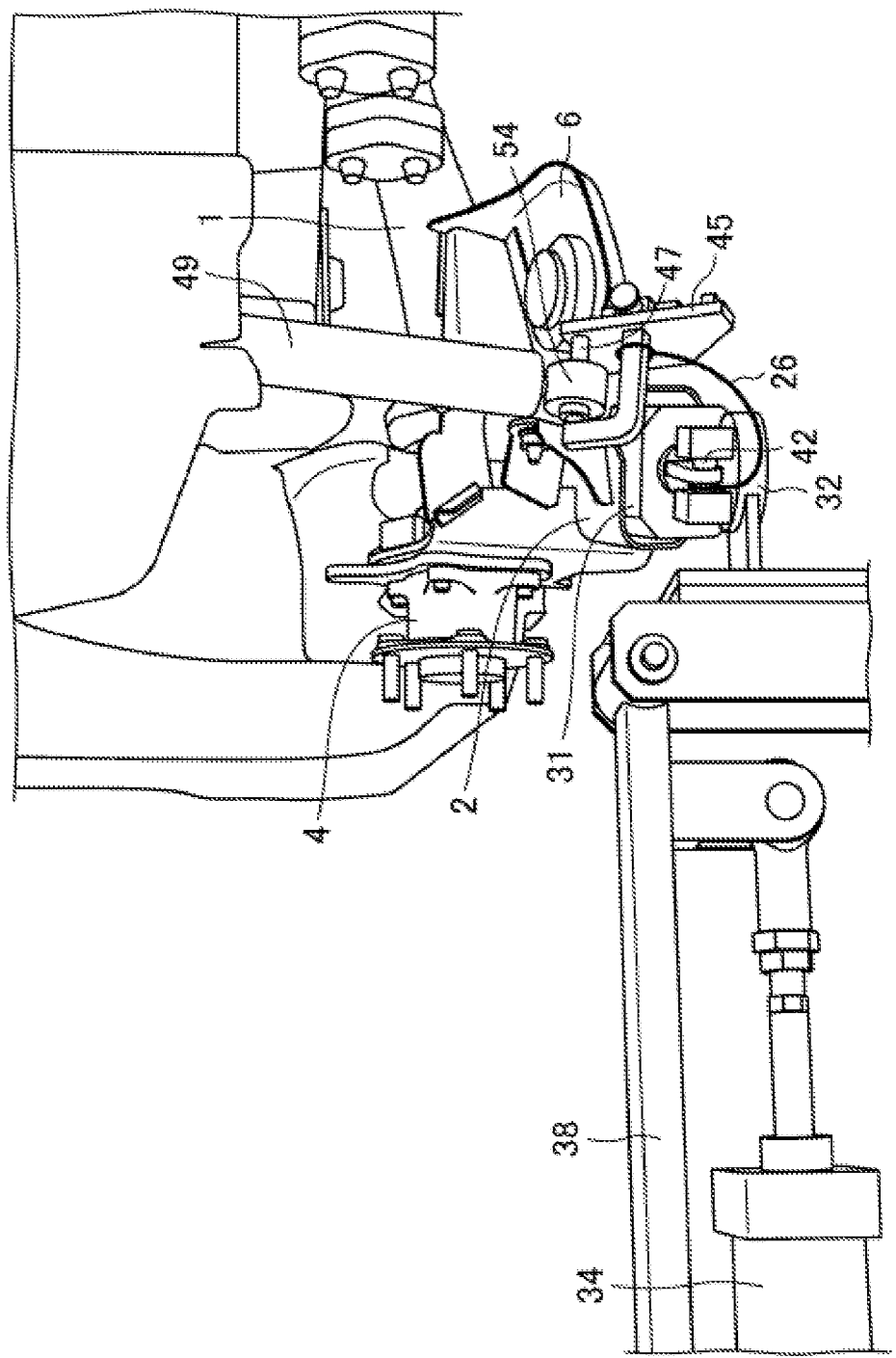
FIG. 6 is a perspective view of the same state seen from the vehicle rear side.

Moreover, as shown in FIG. 6, the fastener 45 of the fastening member 26 is coupled to the lower end of the damper 49. The upper end of the damper 49 is pivotally mounted to the vehicle body 7 in advance. After the coil spring 9 is interposed, a bushing 54 at the lower end of the damper 49 is pivotally mounted, using a pin 56, to a support member 55 secured to an upper surface of the rear end portion of the swing arm 2 shown in FIG. 7 or the like. When imposing the coil spring 9, the fastening member 26 is brought into a distorted state, and then the fastener 45 is coupled to the damper 49 by putting the pin 48 of the fastener 45 through the bushing 54 at the lower end of the damper 49.

Figure 7:
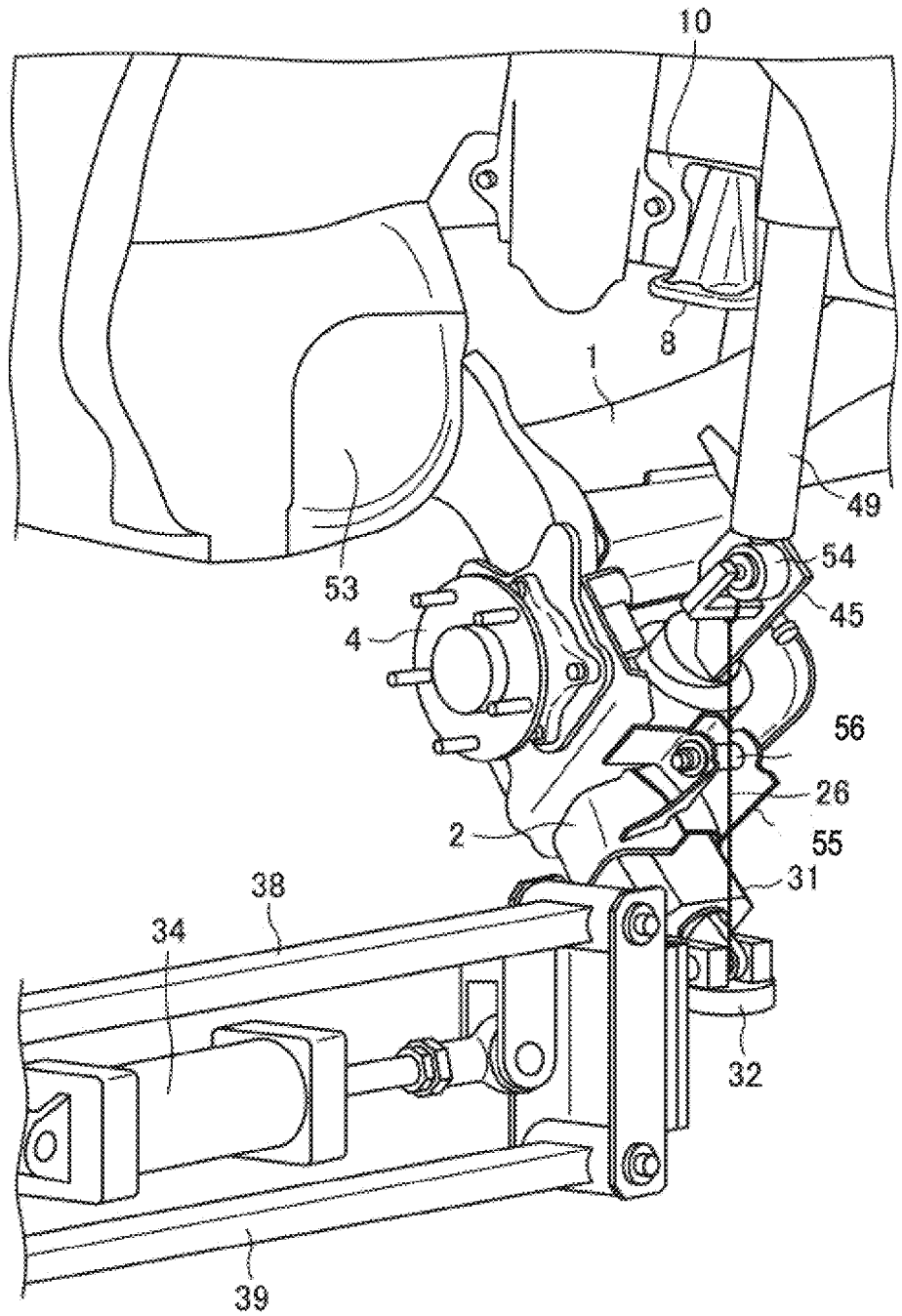
FIG. 7 is a perspective view, seen from the vehicle rear side, of a state in which the orientation of the suspension member is changed until a fastening member is in a stretched state.
Figure 8:
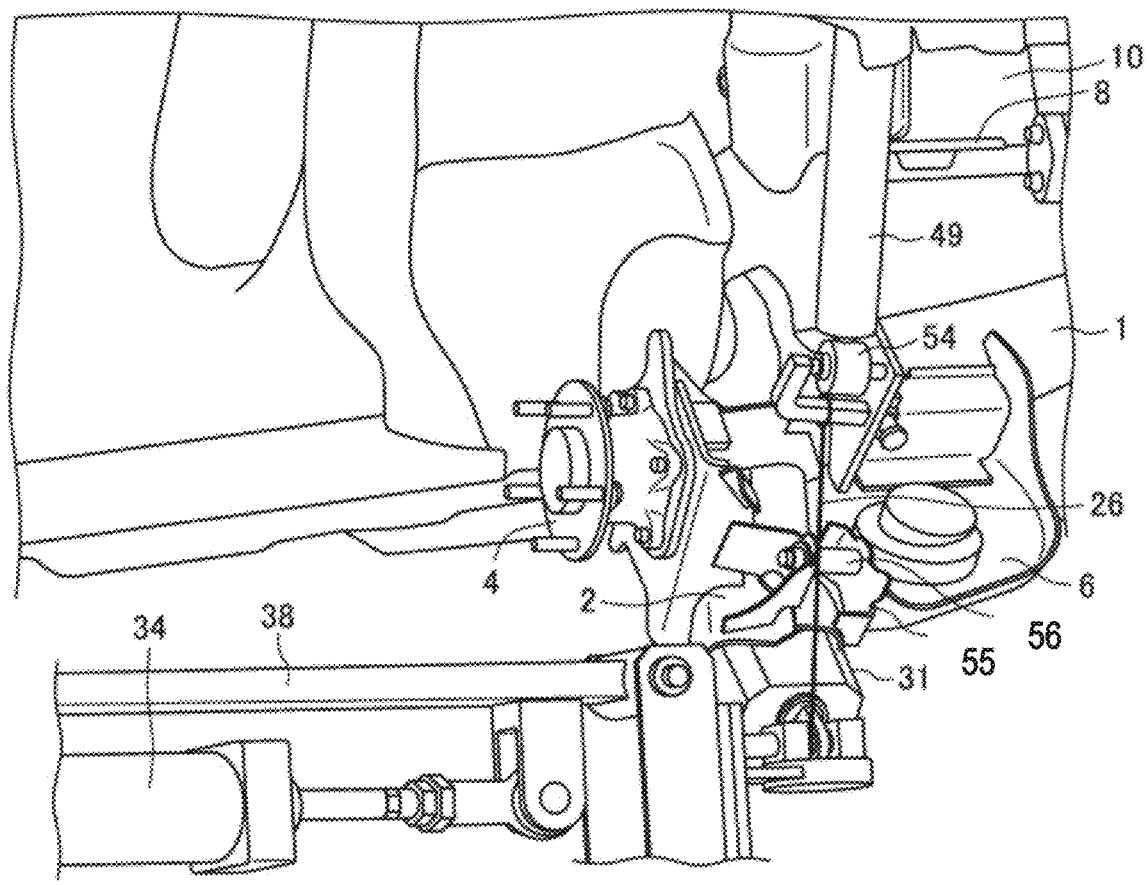
FIG. 8 is a perspective view of the same state seen at a different angle from the vehicle rear side.

In this state, by activating the drive cylinder 34 to retract the piston rod, the movable plate 27 of the parallel link mechanism 33 is lowered. Consequently, as shown in FIG. 7 and FIG. 8, the support member 32 secured to the movable plate 27 is lowered together with the engaging member 31, and the swing arm 2 moves pivotally downward. That is to say, the orientation of the swing arm 2 relative to the vehicle body 7 is changed so as to increase the distance between the spring seat 6 on the swing arm 2 side and the spring seat 8 on the vehicle body side.

With the change in orientation of the swing arm 2, the distortion of the fastening member 26 is eliminated, and the fastening member 26 reaches the stretched state in which tension is applied between the swing arm 2 and the damper 49. When the orientation of the swing arm 2 is changed until the fastening member 26 is in the stretched state, a further orientation change is restricted by the fastening member 26, irrespective of an output of the drive cylinder 34.

Figure 9:
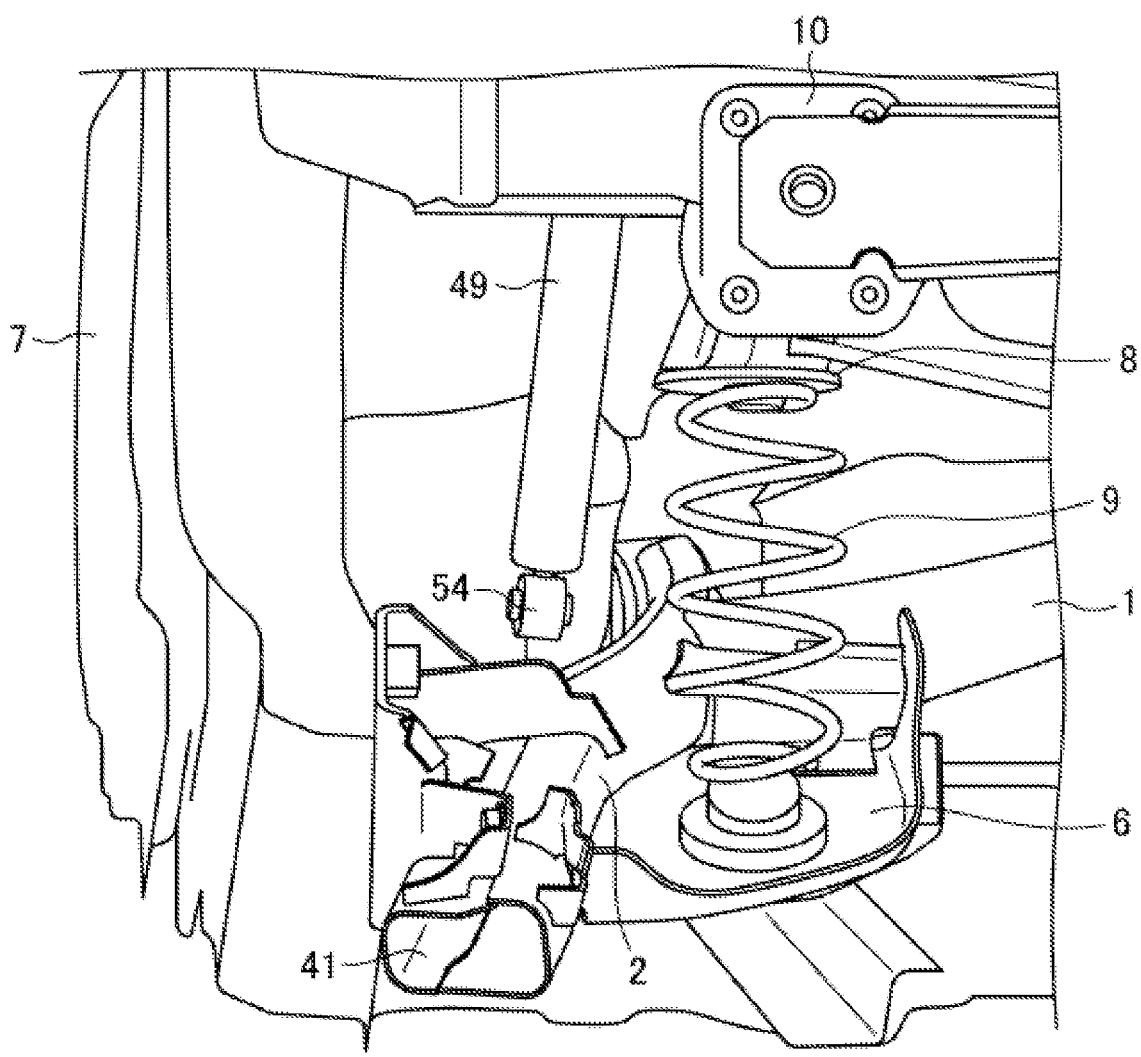
FIG. 9 is a perspective view, seen from the vehicle rear side, of a state in which a coil spring is inserted between the vehicle body and a spring seat of the suspension member.

When the orientation of the swing arm 2 is changed until the fastening member 26 is in the stretched state, as shown in FIG. 9, the distance between the spring seats 6 and 8 is increased to a size allowing insertion of the coil spring 9 between the spring seats 6 and 8 without compressing the coil spring 9. Therefore, it is easy to insert the coil spring 9 between the spring seats 6 and 8. Note that, in FIG. 9, illustration of the axle device 4, the fastening member 26, the engaging member 31 and so on is omitted.

After the insertion of the coil spring 9, when the output of the drive cylinder 34 is cancelled, the swing arm 2 moves pivotally upward until reaching an orientation for balancing the elastic force of the rubber bushing 3 and the elastic force of the coil spring 9, while compressing the coil spring 9 by the elastic restoring force of the rubber bushing 3. Thereafter, the engaging member 31 is removed from the rear-end opening 41 of the swing arm 2.

As described above, the change in the orientation of the swing arm 2 to interpose the coil spring 9 is restricted by the fastening member 26 connecting the swing arm 2 and the vehicle body 7 (the damper 49 coupled to the vehicle body 7). This means that the swing arm 2 is restricted regarding the change in the orientation relative to the vehicle body 7, rather than the absolute orientation change.

Therefore, even if the position and orientation of the vehicle body 7 are not always uniform due to wear of the vehicle body conveyance device or the like, or differences in vehicle models of mixed model production, when the orientation of the swing arm 2 is changed to interpose the coil spring 9, it is possible to prevent the suspension device including the swing arm 2 from interfering with other vehicle body components, or avoid strain on the suspension device and other vehicle body components. That is to say, the coil spring 9 can be inserted between the swing arm 2 and the vehicle body 7 by changing the orientation of the swing arm 2, without causing such troubles.

Moreover, when the orientation of the swing arm 2 is changed until the fastening member 26 is in the stretched state, the distance between the spring seats 6 and 8 is increased to a size allowing insertion of the coil spring 9 without compressing the coil spring 9. Therefore, since there is no need to compress the coil spring 9 before the insertion, the cycle time of the assembly process is reduced, which is advantageous for improving the productivity. Further, damage to the coil spring 9 by a compression jig or the like is prevented.

Furthermore, in the embodiment, the swing arm 2 and the damper 49 are connected by the fastening member 26, on the opposite side of the spring seat 6 from the rubber bushing 3. Hence, this is advantageous in restricting an excessive change in the orientation of the swing arm 2 by the fastening member 26, and the fastening member 26 does not interfere with insertion of the coil spring 9 between the spring seats 6 and 8, thereby facilitating the insertion.

Additionally, in the embodiment, since the fastening member 26 is connected to the coupling portion of the damper 49 (the bushing 54 at the lower end of the damper 49) with respect to the swing arm 2, there is no need to newly provide a part on the vehicle body side to connect the fastening member 26, and this is advantageous for reduction of the cost of the product.

Note that, in the embodiment, although the parallel link mechanism 33 is employed as means for moving up and down the engaging member 31 of the orientation changing mechanism 25, this is not a limitation, and the engaging member 31 can be moved up and down directly by drive means such as a drive cylinder and a drive motor, or indirectly with the use of a link mechanism.

In the embodiment, although the orientation changing mechanism is caused to travel in synchronization with the vehicle body, the orientation changing mechanism may be of a stationary type.

In the embodiment, although the wire is used as the fastening member, this is not a limitation, and, for example, a chain can be used as the fastening member, or, in other words, the fastening member can be anything as along as the fastening member is stretchable to the stretched state wherein it extends to a certain length when tension is applied, and can restrict the change in the orientation of the suspension member.

What is claimed is:

1. An assembly method for a suspension device of a vehicle, the suspension device comprising a suspension member which is elastically and swingably supported by a vehicle body and supports a wheel; and a coil spring which is interposed between the vehicle body and the suspension member and receives a compression load, the assembly method being characterized by:

bringing a fastening member into a distorted state, and connecting the suspension member, which is elastically and swingably supported by the vehicle body, and the vehicle body or a vehicle part attached to the vehicle body, by the fastening member, the fastening member being stretchable to a stretched state wherein the fastening member extends to a certain length when tension is applied;

forcibly changing orientation of the suspension member with respect to the vehicle body so as to increase a distance between the vehicle body and the suspension member at an interposition portion of the coil spring;

restricting a change in the orientation of the suspension member relative to the vehicle body by the fastening member which stretches to the stretched state wherein the fastening member extends to the certain length with the increase in the distance caused by the change in the orientation of the suspension member, and inserting the coil spring between the vehicle body and the suspension member;

in a state in which the orientation of the suspension member is changed until the fastening member is in the stretched state, the coil spring is inserted between the vehicle body and the suspension member;

the suspension member is elastically and swingably supported by the vehicle body through a rubber bushing, and the vehicle body or the vehicle part and the suspension member are connected by the fastening member, on an opposite side of the interposition portion of the coil spring from the rubber bushing on the suspension member;

the suspension member is a torsion beam suspension member, and a spring seat for disposing the coil spring is provided on a swing arm of the suspension member;

a damper for connecting the vehicle body and the swing arm is provided as the vehicle part;

the orientation of the swing arm is forcibly changed in a state in which the damper is coupled to the vehicle body and is not coupled to the swing arm; and the fastening member is connected to a coupling portion of the damper with respect to the swing arm.

2. The assembly method for the suspension device of the vehicle according to claim 1, characterized in that, when the orientation of the suspension member is changed until the fastening member is in the stretched state, the distance between the vehicle body and the suspension member at the interposition portion of the coil spring is increased to a size allowing insertion of the coil spring into the interposition portion without compressing the coil spring.

3. The assembly method for the suspension device of the vehicle according to claim 1, characterized in that assembling of the suspension device is performed on a mixed model production line for a plurality of vehicle models.

4. An assembly method for a suspension device of a vehicle, the suspension device comprising a suspension member which is elastically and swingably supported by a vehicle body and supports a wheel; and a coil spring which is interposed between the vehicle body and the suspension member and receives a compression load, the assembly method being characterized by:

bringing a fastening member into a distorted state, and connecting the suspension member, which is elastically and swingably supported by the vehicle body, and the vehicle body or a vehicle part attached to the vehicle body, by the fastening member, the fastening member being stretchable to a stretched state wherein the fastening member extends to a certain length when tension is applied;

forcibly changing orientation of the suspension member with respect to the vehicle body so as to increase a distance between the vehicle body and the suspension member at an interposition portion of the coil spring;

restricting a change in the orientation of the suspension member relative to the vehicle body by the fastening member which stretches to the stretched state wherein the fastening member extends to the certain length with the increase in the distance caused by the change in the orientation of the suspension member, and inserting the coil spring between the vehicle body and the suspension member;

the suspension member is elastically and swingably supported by the vehicle body through a rubber bushing, and the vehicle body or the vehicle part and the suspension member are connected by the fastening member, on an opposite side of the interposition portion of the coil spring from the rubber bushing on the suspension member;

the suspension member is a torsion beam suspension member, and a spring seat for disposing the coil spring is provided on a swing arm of the suspension member;

a damper for connecting the vehicle body and the swing arm is provided as the vehicle part, the orientation of the swing arm is forcibly changed in a state in which the damper is coupled to the vehicle body and is not coupled to the swing arm, and the fastening member is connected to a coupling portion of the damper with respect to the swing arm.

\* \* \* \* \*